UNITED STATES PATENT OFFICE.

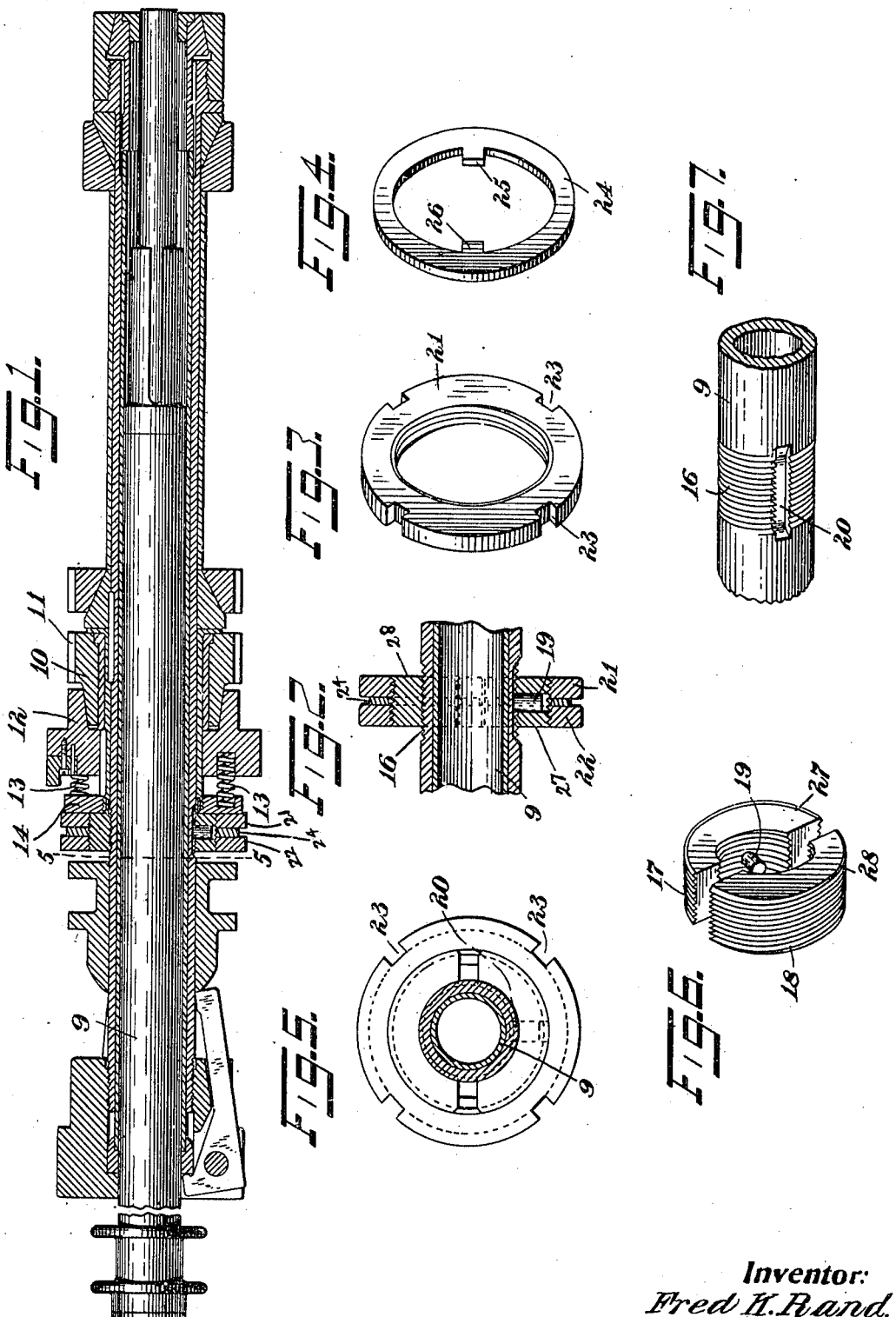

FRED K. RAND, OF CLEVELAND, OHIO, ASSIGNOR TO THE NATIONAL ACME MANUFACTURING COMPANY, OF CLEVELAND, OHIO, A CORPORATION OF OHIO.

SPLIT ADJUSTING-NUT FOR SPINDLES.

955,902.  Specification of Letters Patent.  Patented Apr. 26, 1910.

Application filed July 13, 1909. Serial No. 507,321.

*To all whom it may concern:*

Be it known that I, FRED K. RAND, a citizen of the United States, residing in Cleveland, in the county of Cuyahoga and State of Ohio, have invented certain new and useful Improvements in Split Adjusting-Nuts for Spindles, of which the following is a specification.

This invention has reference to a locking device for adjustably securing a removable stop on a tube or rod, that can be applied and removed on a tube having an intermediate portion only threaded, and which can be adjusted with a very great nicety, and which will remain securely locked in adjusted position.

The invention is especially designed for use with the stock spindles of automatic screw machines and the like.

In the accompanying drawing representing one embodiment of my invention, Figure 1 is a longitudinal axial section through various parts of a stock spindle, showing the invention in position thereon. Fig. 2 is a similar view enlarged showing the device, and a small portion of the stock tube on which it is applied. Fig. 3 shows in perspective one of the ring nuts as shown in Fig. 2. Fig. 4 shows in perspective the washer located between the ring nuts. Fig. 5 is a section on the line 5—5 indicated in Fig. 1. Fig. 6 shows in perspective a split nut member; and Fig. 7 is a view of the threaded tube or sleeve where engaged by the device.

The invention is shown as applied to the tube or spindle 9 of a screw machine as indicated in Fig. 1. The spindle is driven through a clutch member 10 having a gear 11 normally rotated; the gear member 10 being loose on the spindle. A clutch member 12 fast on the spindle for rotation, but endwise movable by suitable means, engages the other clutch member, and is pressed thereto by springs 13, 13 engaging this clutch member by one end, while the other end engages a ring member 14. It is the purpose of the locking device of this invention, to lock this ring plate 14 in adjusted positions. For this purpose the spindle 9 has a threaded portion 16 cut in its surface, and therefore the threads will be below the spindle surface and cannot be engaged by a nut that would slide on the spindle. Hence a split nut
member 17 is provided whose bore is threaded to fit on the threaded portion 16, and its exterior 18 is also threaded. The split nut is provided with means for preventing its turning on the spindle, yet permitting it to be placed thereon in different endwise positions for adjustment. It is shown as having an internal pin 19, that engages in a slot 20 in the threaded portion 16. The slot extends lengthwise to permit the nut member to be placed in different positions, but prevented from rotating in all such positions. It is obvious that suitable ring nut members can be slid over the sleeve to engage the threaded portion 18 of the split nut member, and two ring nuts 21 and 22 are shown, which may have notches 23 in their exterior to engage a spanner for locking and unlocking. A washer member or ring 24 is slidable on the split nut and located between the two ring nuts. Means are provided for preventing rotation of this washer, yet permitting its endwise movement with the adjustment of the ring nuts. It is shown as provided with lugs 25 and 26 in its bore that project between the opposing faces of the two members 27 and 28 of the split nut member 18. These lugs will serve to keep the split nut members apart; and as one of them 27 is prevented from turning by its pin, this washer member will serve to prevent turning also of the other split nut member 28.

In the operation of the device, the split nut parts are placed on the threaded portion 16 of the spindle close to the ring plate 14, with the pin 19 projecting into the slot 20 in the spindle. Then the ring nut member 21 is screwed on, and the washer is slid onto the same with its lugs projecting between the two portions 27 and 28 of the split nut. Next the other ring nut member is screwed on the split nut. The ring nut 21 is screwed up against the ring plate 14, and while held in this position by a spanner, the other ring nut is screwed up to slide the washer against the said ring nut, and is locked in position. These three members will thereupon act as a lock nut, as the washer cannot turn, it will prevent turning of the first ring nut, and it will also serve to prevent turning of the other ring nut. When desired the ring nuts can be screwed off of the split nut, that can be slipped apart upon the washer being removed, and advanced the distance of one or more threads in either direction, and the parts again assembled and locked.

Having thus described my invention, I claim:

1. In combination, a sleeve having a threaded portion cut into its convex face, a split nut member threaded internally to engage the threaded portion of the sleeve and also threaded externally, means for preventing turning of the nut member on the sleeve, a pair of ring nut members with their bore threaded to screw onto the nut member, and a washer member slidable on the split nut member between the said ring nuts and provided with means permitting endwise movement but preventing turning of the washer on the split nut member.

2. In combination, a sleeve having a threaded portion cut into its convex face, a split nut member threaded internally to engage the threaded portion of the sleeve and also threaded externally, means for preventing turning of the nut member on the sleeve, a pair of ring nut members with their bore threaded to screw onto the nut member, a washer member slidable on the split nut member between the said ring nuts and provided with means permitting endwise movement but preventing turning of the washer on the split nut member.

3. In combination, a tube, a split nut member adjustably attached on the sleeve and threaded externally, means for preventing turning of the nut member on the sleeve, a pair of ring nut members with their bore threaded to screw onto the nut member, and a washer member slidable on the split nut member between the said ring nuts and provided with means permitting endwise movement but preventing turning of the washer on the split nut member.

4. In combination, a sleeve, a split nut member adjustably attached on the sleeve with the ends of the split portions separated, a pair of ring nut members with their bore threaded to engage the split nut member, and a washer member slidable on the sleeve at the threaded portion and having a lug in its bore projecting between two opposite faces of the split nut member permitting endwise movement of the washer but preventing its turning on the nut member.

5. In combination, a sleeve having an exterior threaded portion, a split nut member threaded inside and out and engaging at its bore the said threads of the sleeve with the ends of the split portions separated, a pin on one of the nut members projecting inwardly, the tube having a slot into which the pin projects to prevent turning of the nut member on the sleeve, a pair of ring nut members with their bore threaded to engage the split nut member, and a washer member slidable on the sleeve at the threaded portion and having means permitting endwise movement of the washer but preventing its turning on the nut member.

6. In combination, a sleeve having an exterior threaded portion, a split nut member threaded inside and out and engaging at its bore the said threads of the sleeve with the ends of the split portions separated, a pin on one of the nut members projecting inwardly, a slot in the sleeve into which the pin projects to prevent turning of the nut member on the sleeve, a pair of ring nut members with their bore threaded to engage the split nut member, and a washer member slidable over the split nut member and having inwardly projecting lugs inserted between the opposite faces of the parts of the split nut member, whereby the washer has endwise movement but is prevented from rotating on the split nut, and its lugs positioning the parts of the split nut member.

7. In combination, a sleeve, a split nut member adjustably attached on the sleeve with the ends of the split portions separated, a pin on one of the nut members projecting inwardly, a slot in the tube into which the pin projects to prevent turning of the nut member on the tube, a pair of ring nut members with their bore threaded to engage the split nut member, and a washer member slidable over the split nut member and having inwardly projecting lugs inserted between the opposite faces of the parts of the split nut member, whereby the washer has endwise movement but is prevented from rotating on the split nut, and its lugs positioning the parts of the split nut member.

FRED K. RAND.

Witnesses:
A. W. HENN,
A. W. HOPKINS.